United States Patent [19]

Winnick

[11] Patent Number: 4,772,366
[45] Date of Patent: Sep. 20, 1988

[54] ELECTROCHEMICAL SEPARATION AND CONCENTRATION OF SULFUR CONTAINING GASES FROM GAS MIXTURES

[75] Inventor: Jack Winnick, Atlanta, Ga.
[73] Assignee: Gas Research Institute, Chicago, Ill.
[21] Appl. No.: 22,723
[22] Filed: Mar. 6, 1987
[51] Int. Cl.[4] .............................................. C25B 1/00
[52] U.S. Cl. ..................................... 204/128; 204/130
[58] Field of Search ................. 204/128, 130, 96, 101, 204/291

[56] References Cited
U.S. PATENT DOCUMENTS

Re. 31,778 12/1984 Winnick ................................ 204/130
4,246,081 1/1981 Winnick ................................ 204/130

Primary Examiner—R. L. Andrews
Attorney, Agent, or Firm—Kokjer, Kircher, Bradley, Wharton, Bowman & Johnson

[57] ABSTRACT

An electrochemical cell is provided for removing $H_2S$ from a gas mixture. The cell includes porous, gas diffusion electrodes and a membrane containing an aqueous alkaline polysulfide electrolyte. $H_2S$ is reduced to polysulfide ions at one electrode and the ions migrate through the membrane to the other electrode where they are oxidized to form elemental sulfur. Another embodiment of the invention utilizes a solvent to remove the $H_2S$ from the gas mixture. Bisulfide ions are formed and are oxidized in an electrochemical cell to form elemental sulfur. The solvent is regenerated in the cell and recycled.

27 Claims, 1 Drawing Sheet

ELECTROCHEMICAL SEPARATION AND CONCENTRATION OF SULFUR CONTAINING GASES FROM GAS MIXTURES

BACKGROUND OF THE INVENTION

This invention relates in general to methods for the separation of gas mixtures and, more particularly, to a method for the removal of $H_2S$ from a gas mixture.

Much attention has been focused in recent years on the removal of $H_2S$ from natural or synthetic fuel gases because of environmental concerns. Conventional methods for the removal of $H_2S$ involve the use of aqueous or other types of scrubbers which are expensive to install, operate and maintain. After removal from the gas stream, the $H_2S$ is recovered through thermal regeneration of the scrubbing liquor. The $H_2S$ must then be sent to a Claus or other processing plant to obtain elemental sulfur through partial oxidation of the $H_2S$. These processes, however, are of limited efficiency and have high energy costs.

Electrochemical processes have been utilized for the removal of $H_2S$ and sulfur oxides from high temperature gas streams using an electrolyte comprising molten alkali metal salts to transport sulfate and/or sulfide ions from a cathode to an electrode where they are oxidized and removed as gases. These processes, however, require operating temperatures in excess of the melting point of the alkali metal salt and have limited low temperature applications.

SUMMARY OF THE INVENTION

It is an object of this invention to provide a process operable at ambient temperatures for the separation of $H_2S$ from a gas stream and the subsequent concentration of the $H_2S$.

It is another object of this invention to provide a process for the separation of $H_2S$ from a gas stream and the conversion of the separated $H_2S$ to elemental sulfur without the expenditure of large amounts of energy required by conventional processes.

It is a further object of this invention to provide a process operable at ambient temperatures for the separation of $H_2S$ from a gas stream and the conversion of the $H_2S$ to elemental sulfur.

To accomplish these and other objects of the invention which will be readily apparent to those skilled in the art, an electrochemical cell is provided with an aqueous alkaline polysulfide electrolyte solution. The $H_2S$-containing gas stream is brought into contact with a cathode and reduced to $H_2$ and polysulfide ions. The polysulfide ions migrate to an anode where they may be oxidized to form elemental sulfur or reacted with a fuel to form concentrated $H_2S$.

In another embodiment of the invention, the gas stream is contacted with an alkaline solvent to form sulfur ions and water. The solvent containing the sulfur ions and water is transported to an electrochemical cell where the sulfur ions are oxidized to elemental sulfur.

BRIEF DESCRIPTION OF THE DRAWINGS

In the accompanying drawings which form a part of the specification and are to be read in conjunction therewith.

DESCRIPTION OF THE PREFERRED EMBODIMENTS

Figure 1:
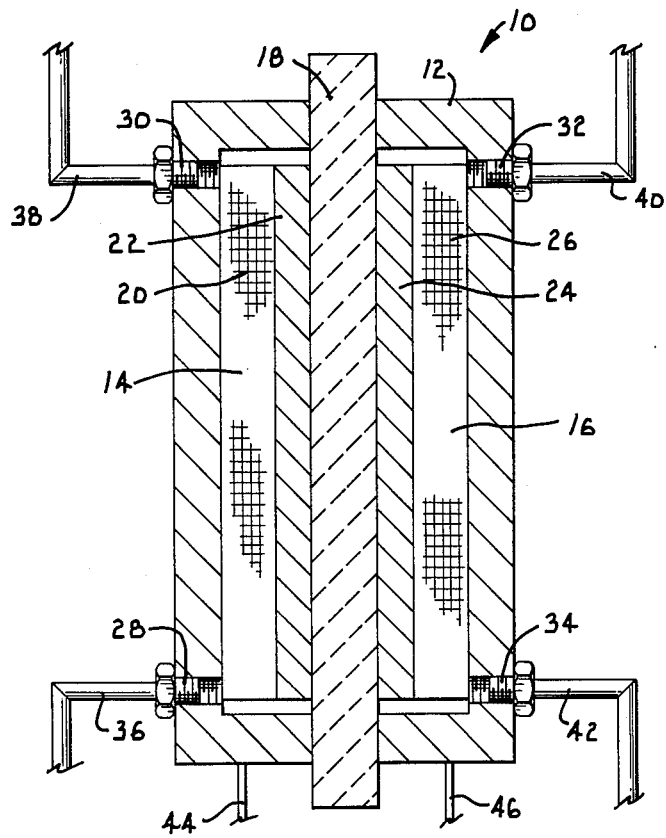
FIG. 1 is a schematic representation of an electrochemical cell of the type which may be utilized to carry out the process of one embodiment of the present invention.

Referring now to the drawings in general and FIG. 1 in particular, an electrochemical cell 10 is utilized in a preferred embodiment of the process of the present invention to remove $H_2S$ from a gas stream. The cell 10 includes a housing 12 which may be constructed from stainless steel and is divided into a first region 14 and a second region 16 by a centrally disposed porous mat membrane 18 which contains an electrolyte. The membrane 18 is preferably electrically nonconductive and is inert to the gas mixture and the electrolyte. Suitable materials which may be utilized for the membrane 18 include asbestos or zirconia felt formed into a mat of cross-linked fibers having pore sizes with wetting characteristics to retain the electrolyte. The membrane 18 is typically of a 30 mil thickness.

A porous grid 20 holds a highly porous, gas diffusion electrode or cathode 22 in contacting relationship with the membrane 18 in the first region 14. The cathode 22 is preferably nickel based and may include cobalt sulfide and molybdenum disulfide as catalysts as well as other materials which are electrically conductive, chemically and mechanically stable under the operating conditions, and have a high reactivity for the desired reactions. A highly porous, gas diffusion electrode or anode 24 contacts the membrane 18 in the second region 16 and is held in place by a porous grid 26. The anode 24 may be constructed from the same materials as are suitable for the cathode 22.

Cathode inlet and outlet ports 28 and 30, respectively, and anode inlet and outlet ports 32 and 34 are formed in the housing 12. The ports 28, 30, 32, and 34 are respectively coupled with flow lines 36, 38, 40, and 42. Electrical lines 44 and 46 are in electrical contact with cathode 22 and anode 24, respectively.

The electrolyte which is utilized in the process of this invention may comprise aqueous alkali-metal polysulfide solutions comprising sodium, potassium, lithium or cesium polysulfides or mixtures thereof and may also include other cations such as tetramethyl ammonium and tetraethyl ammonium. The electrolyte must be chemically stable under the operating conditions, have a selectivity for the $H_2S$, a high reactivity for the $H_2S$, and a high solubility for a high ion concentration.

In operation, a gas mixture containing $H_2S$ is directed through line 36 and inlet port 28 into the first region 14 where it contacts the cathode 22. Current flow is effected through lines 44 and 46 and between the cathode 22 and anode 24 by an external power source. The $H_2S$ diffuses into a thin layer of the electrolyte solution and is reduced to $H_2$ gas and polysulfide ions according to the following reactions:

$$S_2^{2-} + 2e \rightarrow 2S^{2-}$$

$$H_2O + 2e \rightarrow \tfrac{1}{2}H_2 + OH^-$$

$$S^{2-} + H_2O = HS^- + OH^-$$

$$OH^- + H_2S \rightarrow H_2O + HS^-$$

$$H_2S + S^{2-} \rightarrow H_2 + S_2^{2-}$$

The polysulfide ions then migrate across the membrane 18 to maintain neutrality and concentrate at the anode 24 where they are oxidized to elemental sulfur or concentrated H₂S as follows:

$$S_2^{2-} \rightarrow S_2 + 2e$$

$$S^{2-} \rightarrow S + 2e$$

$$OH^- + HS^- \rightarrow H_2O + S + 2E$$

or $$H_2 + S^{2-} \rightarrow H_2S + 2e$$

The sulfur formed is of lesser density than the electrolyte solution and will form liquid globules which may be collected and removed through port 34 and line 42. The process is normally conducted at ambient operating temperatures and does not require a start up period for activation of the electrolyte. Accordingly, only small amounts of electrical energy are required for the one-step conversion of H₂S to elemental sulfur. The process, however, may also be conducted at elevated or reduced temperatures.

The overall reaction for the process is:

$$H_2S \rightarrow H_2 + S$$

In a commercial operation for the removal of H₂S from a gas mixture, stacks of electrochemical cells 10 would be utilized. The cells 10 would preferably be arranged in a bipolar array although other suitable arrangements may be utilized.

In a slight modification of the previously described process, the requirement of an external power source may be eliminated by utilizing a reducing gas such as H₂ gas to oxidize the polysulfide ions at the anode. Current flow is effected by coupling together electrical lines 44 and 46 and directing the H₂ gas through the anode inlet port 32 across the anode 24. The H₂ is then removed through anode outlet port 34. The reactions at the cathode 22 remain the same and the primary reaction at the anode 24 is as follows:

$$H_2 + S^{2-} \rightarrow H_2S + 2e$$

The concentrated H₂S which is formed may be removed through port 34 and line 42. The process may be conducted at ambient operating temperatures although it may also be conducted at elevated or reduced temperatures.

Figure 2:
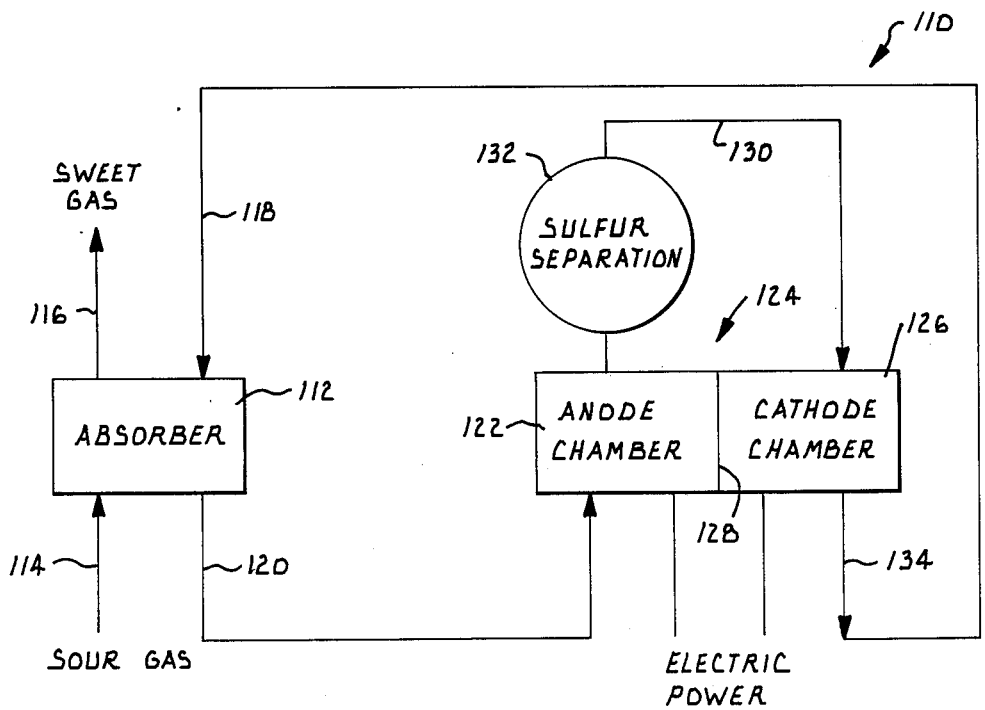
FIG. 2 is a schematic representation of the apparatus which may be utilized to carry out the process of a second embodiment of the present invention.

Referring now to FIG. 2, an apparatus which may be used in an alternate embodiment of the process of the present invention is represented generally by the numeral 110. The apparatus 110 includes an exchange column or absorber 112 coupled with a gas inlet line 114, gas outlet line 116, solvent inlet line 118 and solvent outlet line 120. The solvent outlet line 120 is coupled with an anode chamber 122 of an electrochemical cell or regenerator 124. A cathode chamber 126 is separated from the anode chamber 122 by an ion exchange membrane 128. The membrane 128 is preferably polymeric and is cationic or anionic specific, but may comprise other known types of membranes having suitable properties. Both chambers 126 and 128 contain flow-through electrodes which are preferably nickel based and may contain a layer of cobalt sulfide or molybdenum disulfide as catalysts and may contain other substances with the desired properties of electrical conductivity, chemical and mechanical stability, and high reactivity for the desired reactions.

A regeneration line 130 containing a sulfur separator 132 leads from the anode chamber 122 to the cathode chamber 126. The sulfur separator 132 may comprise suitable solid-liquid removal devices such as skimming, filtration or centrifugation devices. A recycle line 132 leads from the cathode chamber 126 and forms the solvent inlet line 118 leading to the absorber 112. Electrical lines 136 are coupled with the electrodes contained in the anode and cathode chambers 122 and 126.

In operation, sour gas containing H₂S enters the absorber 112 through inlet line 114 and is contacted with fresh, aqueous alkaline solvent entering the absorber 112 through inlet line 118. The solvent must be alkaline enough to react with the H₂S, must be chemically stable in the sour gas environment, and preferably has long term stability in the absorption and regeneration environments. The solvent preferably contains hydroxide of sodium and bisulfide (HS⁻) ions with lesser amounts of polysulfides ($S_2^{2-}$, $S_3^{2-}$, $S_5^{2-}$). Suitable solvents include aqueous sodium sulfide, potassium sulfide, lithium sulfide, cesium sulfide, organic sulfides such as tetramethyl ammonium sulfide and mixtures thereof. Free hydroxide may be added to the solvent to attain proper pH. The H₂S is removed by the hydroxide ions to form more bisulfide ions and water according to the following reaction:

$$H_2S + OH^- \rightarrow H_2O + HS^-$$

The sweet gas is then removed from the absorber through outlet line 116. The spent solvent containing the bisulfide and water is pumped through outlet line 120 to the anode chamber 122 where a current flow is effected between the anode and cathode to oxidize the sulfur ions to elemental sulfur as follows:

$$S^{2-} \rightarrow S + 2e$$

or $$OH^- + HS^- \rightarrow H_2O + S + 2e$$

The sulfur has a low solubility in the acidified solution and forms a suspension having a different density than the solvent. The solvent and sulfur are then directed from the anode chamber 122 through line 130 and the sulfur is removed in separator 132. The lean solvent is directed to the cathode chamber 126 for regeneration according to the following reaction:

$$H_2O + 2e \rightarrow \tfrac{1}{2}H_2 + OH^-$$

The sodium, potassium, or other cations in the anode chamber 122 migrate through the membrane 128 to the cathode chamber 126 to maintain neutrality. The regenerated solvent is then removed from the cathode chamber through outlet line 134 and directed to the absorber 112 through line 118. The hydrogen which is generated in the cathode chamber 126 may be separated from the regenerated solvent and added to the sweet gas carried from the absorber 112 in line 116. Although pumping is required in this alternate embodiment, the process produces elemental sulfur and has a higher efficiency and lower energy requirement than conventional processes.

In a slight modification of the alternate embodiment, the solvent regeneration may be carried out with less need for electrical power by adding oxygen to the cathode chamber in a power-reduction scheme:

$$\tfrac{1}{2}O_2 + H_2O + 2e \rightarrow 2OH^-$$

The overall reaction for the process with the addition of electric power is:

$$H_2S \rightarrow H_2 + S$$

The overall reaction for the process with the addition of oxygen to the cathode chamber is:

$$H_2S + \tfrac{1}{2}O_2 \rightarrow H_2O + S$$

Having thus described the invention, I claim:

1. A method for removing $H_2S$ from a gas mixture, said method comprising the steps of:
   providing an electrochemical cell with a porous cathode and a porous anode;
   providing the electrochemical cell with an aqueous electrolyte;
   effecting current flow between the cathode and anode;
   directing the gas mixture containing the $H_2S$ into contact with the cathode to cause reduction of the $H_2S$ to polysulfide ions; and
   allowing the polysulfide ions to migrate from the cathode and concentrate at the anode.

2. The invention of claim 1, including the step of maintaining the current flow between the cathode and anode while the polysulfide ions concentrate at the anode to oxidize the polysulfide ions to elemental sulfur.

3. The invention of claim 2, including the step of removing the elemental sulfur from the electrochemical cell.

4. The invention of claim 1, including the step of directing a stream of $H_2$ gas into contact with the anode to effect the flow of current between the cathode and anode.

5. The invention of claim 1, wherein the step of effecting current flow between the cathode and anode comprises providing an external power source across the cathode and anode.

6. The invention of claim 1, wherein the step of providing an aqueous electrolyte comprises providing an aqueous alkali-metal polysulfide solution.

7. The invention of claim 6, wherein the step of providing an aqueous alkali-metal polysulfide solution comprises providing one or more polysulfides selected from the group consisting of sodium, potassium, cesium, tetramethyl ammonium and tetraethyl ammonium polysulfides.

8. The invention of claim 1, wherein the step of providing a porous cathode and anode comprises providing a nickel based cathode and anode.

9. The invention of claim 8, wherein the step of providing a nickel based cathode and anode includes the step of providing at least one catalyst selected from the group consisting of cobalt sulfide and molybdenum disulfide.

10. The invention of claim 1, including the step of passing hydrogen gas across the anode to oxidize the polysulfide ions to $H_2S$.

11. A method operable at ambient temperature for the removal of $H_2S$ from a gas mixture, said method utilizing an electrochemical cell comprising a cathode, an anode and an aqueous polysulfide electrolyte and comprising the steps of:
    effecting a flow of current between the cathode and anode;
    directing the gas mixture containing the $H_2S$ into contact with the cathode to reduce the $H_2S$ to polysulfide ions;
    allowing the polysulfide ions to migrate through the electrolyte from the cathode to the anode; and
    oxidizing the polysulfide ions at the anode.

12. The invention of claim 11, wherein the step of effecting a flow of current between the cathode and anode comprises directing hydrogen gas into contact with the anode.

13. The invention of claim 11, wherein the step of oxidizing the polysulfide ions at the anode results in the formation of elemental sulfur.

14. A method for the removal of $H_2S$ from a gas mixture, said method comprising the steps of;
    directing the gas mixture to a column;
    contacting the gas mixture in the column with a solvent to reduce the $H_2S$ to bisulfide ions;
    directing the solvent and bisulfide ions into contact with an anode contained in an electrochemical cell comprising the anode, a cathode and a membrane; and
    effecting a flow of current between the anode and cathode to form elemental sulfur from the bisulfide ions.

15. The invention of claim 14, including the step of removing the sulfur from the solvent.

16. The invention of claim 14, wherein the step of contacting the gas mixture with a solvent includes the step of providing a solvent comprising hydroxide and bisulfide ions.

17. The invention of claim 16, including the step of regenerating the solvent by directing the solvent from the anode to the cathode to form hydroxide ions.

18. The invention of claim 17, including the step of returning the regenerated solvent to the column and repeating the previous steps.

19. The invention of claim 17, wherein the step of directing the solvent to the cathode to form hydroxide ions comprises passing $O_2$ gas across the cathode.

20. The invention of claim 14, wherein the step of contacting the gas mixture with a solvent comprises the step of providing a solvent selected from the group consisting of aqueous sodium, potassium, lithium, cesium and tetramethyl ammonium sulfides and mixtures thereof.

21. The invention of claim 11, wherein the aqueous polysulfide electrolyte is selected from the group consisting of sodium, potassium, cesium, tetramethyl ammonium, and tetraethyl ammonium polysulfides.

22. A method for the removal of $H_2S$ from a gas mixture said method comprising the steps of:
    directing the gas mixture to a column;
    contacting the gas mixture in the column with a solvent comprising hydroxide and bisulfide ions to reduce the $H_2S$ to bisulfide ions;
    directing the solvent and bisulfide ions into contact with an anode contained in an electrochemical cell comprising the anode, a cathode and a membrane; and
    effecting a flow of current between the anode and cathode to form elemental sulfur from the bisulfide ions.

23. The invention of claim 22, including the step of removing the sulfur from the solvent.

24. The invention of claim 22, including the step of regenerating the solvent by directing the solvent from the anode to the cathode to form hydroxide ions.

25. The invention of claim 24, including the step of returning the regenerated solvent to the column and repeating the previous steps.

26. The invention of claim 24, wherein the step of directing the solvent to the cathode to form hydroxide ions comprises passing $O_2$ gas across the cathode.

27. The invention of claim 22, wherein the step of contacting the gas mixture with a solvent comprises the step of providing a solvent selected from the group consisting of aqueous sodium, potassium, lithium, cesium and tetramethyl ammonium sulfides and mixtures thereof.

* * * * *